(12) United States Patent
Chen et al.

(10) Patent No.: US 12,189,358 B2
(45) Date of Patent: Jan. 7, 2025

(54) MONITORING METHOD FOR VIBRATION DRILLING STATE OF STACK STRUCTURE MATERIAL

(71) Applicant: Nanjing University of Aeronautics and Astronautics, Jiangsu (CN)

(72) Inventors: Yan Chen, Jiangsu (CN); Nan Guo, Jiangsu (CN); Chaoren Yan, Jiangsu (CN); Yucan Fu, Jiangsu (CN); Honghua Su, Jiangsu (CN); Jiuhua Xu, Jiangsu (CN); Quanli Zhang, Jiangsu (CN)

(73) Assignee: NANJING UNIVERSITY OF AERONAUTICS AND ASTRONAUTICS, Jiangsu (CN)

(*) Notice: Subject to any disclaimer, the term of this patent is extended or adjusted under 35 U.S.C. 154(b) by 531 days.

(21) Appl. No.: 17/524,463

(22) Filed: Nov. 11, 2021

(65) Prior Publication Data
US 2022/0152770 A1    May 19, 2022

(30) Foreign Application Priority Data
Nov. 13, 2020   (CN) .......................... 202011269317.7

(51) Int. Cl.
| | | |
|---|---|---|
| *G05B 19/401* | (2006.01) | |
| *B23Q 15/013* | (2006.01) | |
| *B23Q 15/12* | (2006.01) | |
| *B23Q 17/09* | (2006.01) | |

(52) U.S. Cl.
CPC ......... *G05B 19/401* (2013.01); *B23Q 15/013* (2013.01); *B23Q 15/12* (2013.01); *B23Q 17/0961* (2013.01); *B23Q 17/0971* (2013.01); *G05B 2219/36284* (2013.01)

(58) Field of Classification Search
CPC ........ G05B 19/401; G05B 2219/36284; G05B 2219/49097; G05B 2219/49382; B23Q 15/013; B23Q 15/12; B23Q 17/0961; B23Q 17/0971; B23Q 15/0075; B23Q 17/00; B23Q 41/00; B23B 35/00
See application file for complete search history.

(56) References Cited

U.S. PATENT DOCUMENTS

| | | | | |
|---|---|---|---|---|
| 5,822,212 A | * | 10/1998 | Tanaka ............... | G05B 19/4063 700/87 |
| 2009/0297284 A1 | * | 12/2009 | Brown ............... | G05B 19/4163 700/170 |
| 2013/0189043 A1 | * | 7/2013 | Uchiuzo ............... | B23Q 15/12 408/1 R |
| 2018/0065188 A1 | * | 3/2018 | Kim ...................... | B23Q 17/09 |
| 2018/0088557 A1 | * | 3/2018 | Kim ................... | G05B 19/4099 |
| 2019/0356808 A1 | * | 11/2019 | Park ......................... | G06F 3/12 |

* cited by examiner

*Primary Examiner* — Santosh R Poudel
(74) *Attorney, Agent, or Firm* — JC ONE WORLD

(57) ABSTRACT

A state monitoring method for vibration drilling of a stack structure material is provided. A load power and a torque value of a drilling spindle is monitored during machining. Drilling state are divided according to a machining material of a drill. According to a data of a test library, reference thresholds of two monitoring objects for judging the change of the drilling state are set to achieve the state monitoring for the drilling process. The method monitors the machining process through the monitoring module in the machining system.

2 Claims, 4 Drawing Sheets

MONITORING METHOD FOR VIBRATION DRILLING STATE OF STACK STRUCTURE MATERIAL

CROSS REFERENCE TO RELATED APPLICATION

This patent application claims the benefit and priority of Chinese Patent Application No. 202011269317.7, entitled "Monitoring Method for Vibration Drilling State of Stack Structure Material" filed on Nov. 13, 2020, the disclosure of which is incorporated by reference herein in its entirety as part of the present application.

TECHNICAL FIELD

The present disclosure relates to the field of drilling state monitoring of stack structures, and in particular, to a monitoring method for the vibration drilling state of stack structure.

BACKGROUND ART

To reduce the overall weight and improve the structural strength, stack structure of carbon fiber-reinforced polymers (CFRPs) and metal materials are widely applied to aircraft structural parts. These stack structure are often provided with assembly holes by drilling to meet the assembly requirements. At present, the number of holes required for a large aircraft is usually more than one million most of which are the assembly holes in the structural parts. How to optimize the hole-making quality and improve the hole-making efficiency is the focus to be concerned in aircraft manufacturing.

With the upgrade of machining devices and processes, the vibration machining method has been in widespread applications in metal material drilling. It significantly improves the quality of hole walls, optimizes the linearity and circularity of the holes and reduces the exit burrs, because of the desirable chip breaking effect. However, due to conservative machining parameters used in the machining field of stack structure, the vibration drilling method hasn't addressed the problem of low machining efficiency. This is essentially because materials such as the carbon fiber composites, titanium alloys and aluminum alloys in the stack structure exhibit different performances. Considering that the same machining parameters are used to drill different materials, a small feed speed is selected for the fear of large machining defects, causing the long machining time and the low machining efficiency.

In a Chinese patent application No. 201410504645.9 entitled "Adaptive Online Monitoring Machining Method for Hole Making of Stack structure", an ultrasonic thickness measurement method is used to determine the distance from the bottom of the cutter to the material separation interface during machining, so as to determine machining parameters according to a machining material during drilling. However, in actual use, when the number of materials or the thickness of the materials in the stack structure are large, it is difficult for the ultrasonic sensor to obtain a machining state of a drill during drilling. In a Chinese patent application No. 200910187487.8 entitled "Hole Making Method and Device for Stacked Assembly of Carbon Fiber Composite and Metal Material", the material thickness is recorded in advance and the position sensor is configured to obtain positional information of the cutter, so as to change machining parameters. But when a variable thickness curved-surface part is machined, the feasibility of the method is too poor, it is difficult to realize the efficient hole making and guarantee the machining quality.

SUMMARY

The present disclosure provides a state monitoring method for vibration drilling of a stack structure material, to solve the defects mentioned in the background.

To solve the above technical problems, the present disclosure adopts the following technical solutions.

A monitoring method for vibration drilling state of a stack structure material is provided, which includes:
step 1.0): establishing the drilling signal database, including:
step 1.1): counting various stack structure material to form a set N;
step 1.2): acquiring machining states in following three conditions for each stack structure material in the set N: when the drill bit starts to enter the stack structure material till the drill bit enters the stack structure material completely, when the drill bit is within the stack structure material completely, and when the drill bit starts to drill out from the stack structure material till the drill bit drills out from the stack structure material completely; where each machining state includes a spindle power and a torque value;
step 1.3): superposing any two stack structure materials M1 and M2 in the set N, acquiring a machining state when the drill bit starts to drill out from a stack structure material M1 to enter a stack structure material M2 till the drill bit drills out from the stack structure material M1 completely to enter the stack structure material M2, and recording the machining state to the drilling signal database; and
step 1.4) setting corresponding machining parameters of the drill bit for each machining state, and recording the machining parameters to the drilling signal database; and
step 2.0): performing following steps for a stack structure to be machined, including:
step 2.1): obtaining a sequence of various stack structure material in the stack structure to be machined, and matching the sequence with the drilling signal database to obtain various quasi-machining states to be sequentially implemented by a drill and corresponding machining parameters of the various quasi-machining states;
step 2.2): machining, with the drill, the stack structure to be machined, and acquiring a real time machining state of the drill through the monitoring system; and
step 2.3): matching the real-time machining state of the drill with one quasi-machining state of the various quasi-machining states to be sequentially implemented by the drill, and machining the stack structure to be machined by the drill bit according to machining parameters of the one quasi-machining state, if an absolute value of a difference between a spindle power of the real-time machining state and a spindle power of the one quasi-machining state is less than a predetermined power error threshold or an absolute value of a difference between a torque value of the real-time machining state and a torque value of the one quasi-machining state is less than a predetermined torque error threshold.

A monitoring device is also provided, which includes:

a test database, which is communicatively connected with numerical control system, and is configured to include:
following three conditions for each stack structure material in the set N of the stack structure material: when the drill bit starts to enter the stack structure material till the drill bit enters the stack structure material completely, when the drill bit is within the stack structure material completely, and when the drill bit starts to drill out from the stack structure material till the drill bit drills out from the stack structure material completely; where each machining state includes a spindle power and a torque value;
following conditions for any two stack structure materials M1 and M2 in the set N of the stack structure material: when the drill bit starts to drill out from a stack structure material M1 to enter a stack structure material M2 till the drill bit drills out from the stack structure material M1 completely to enter the stack structure material M2, and recording the machining state to the drilling signal database; and
machining parameters of the drill bit for each of the conditions;
an execution system, which is communicatively connected with the numerical control system;
a monitoring system, which is communicatively connected with the numerical control system and the execution system; and
the numerical control system, which is configured for:
obtaining a sequence of various stack structure material in the stack structure to be machined, and searching test database to obtain various quasi-machining states to be sequentially implemented by a drill and corresponding machining parameters of a drill bit for the various quasi-machining states;
controlling the drill bit to machine the stack structure to be machined, and receiving a real-time machining state of the drill through the monitoring system; and
comparing the real-time machining state of the drill with one quasi-machining state of the various quasi-machining states to be sequentially implemented by the drill, and controlling the stack structure to be machined by the drill bit to be machined according to machining parameters of the one quasi-machining state, if an absolute value of a difference between a spindle power of the real-time machining state and a spindle power of the one quasi-machining state is less than a predetermined power error threshold or an absolute value of a difference between a torque value of the real-time machining state and a torque value of the one quasi-machining state is less than a predetermined torque error threshold.

Compared with the prior art, the embodiments adopting the above technical solution have the following technical effects.

When the stack structure is machined with the vibration drilling technology, an actual machining state is determined according to a change of a monitoring signal during machining, and a threshold comparison method adopted is derived from a basic test library, reference information is accurate and reliable, which can provide a technical basis for monitoring of the machining process and parameter machining to improve the machining process.

DETAILED DESCRIPTION OF THE EMBODIMENTS

Figure 1:
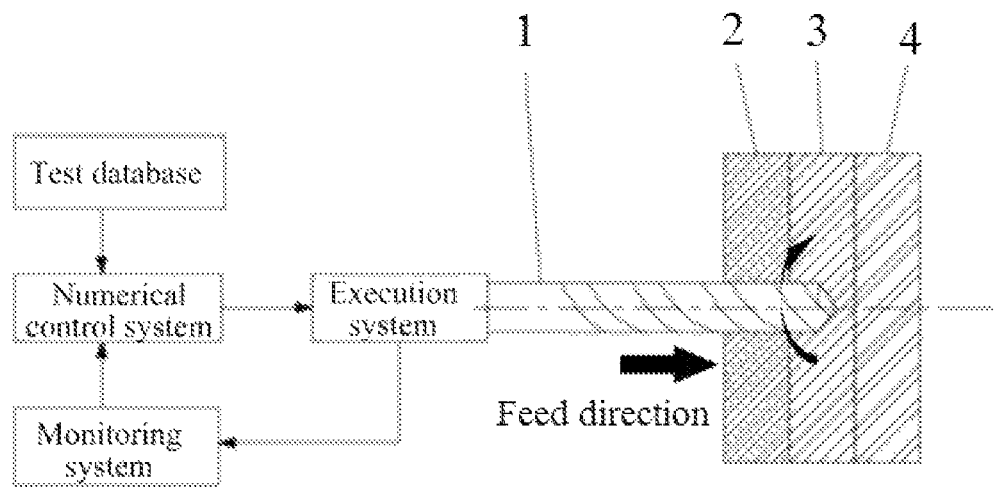
FIG. 1 is a schematic diagram of a structure adapted for implementing a monitoring method used during drilling holes in a stack structure in a vibration manner according to the present disclosure.

The present disclosure will now be described more fully hereinafter with reference to the accompanying drawings.

The present disclosure may, however, be embodied in many different forms and should not be construed as being limited to the embodiments set forth herein. Rather, these embodiments are provided, so that the present disclosure is thorough and complete, and will fully convey the scope of the present disclosure to a person skilled in the art. In the drawings, the components are exaggerated for clarity.

Figure 3:
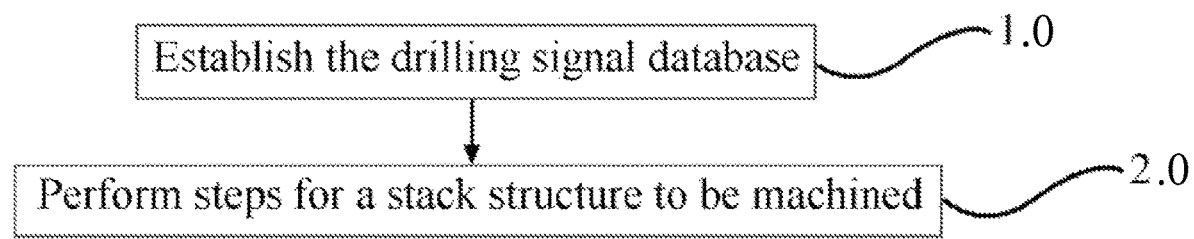
FIG. 3 is a flow chart of the monitoring method for vibration drilling state of a stack structure material according to an embodiment of the present disclosure.
Figure 4:
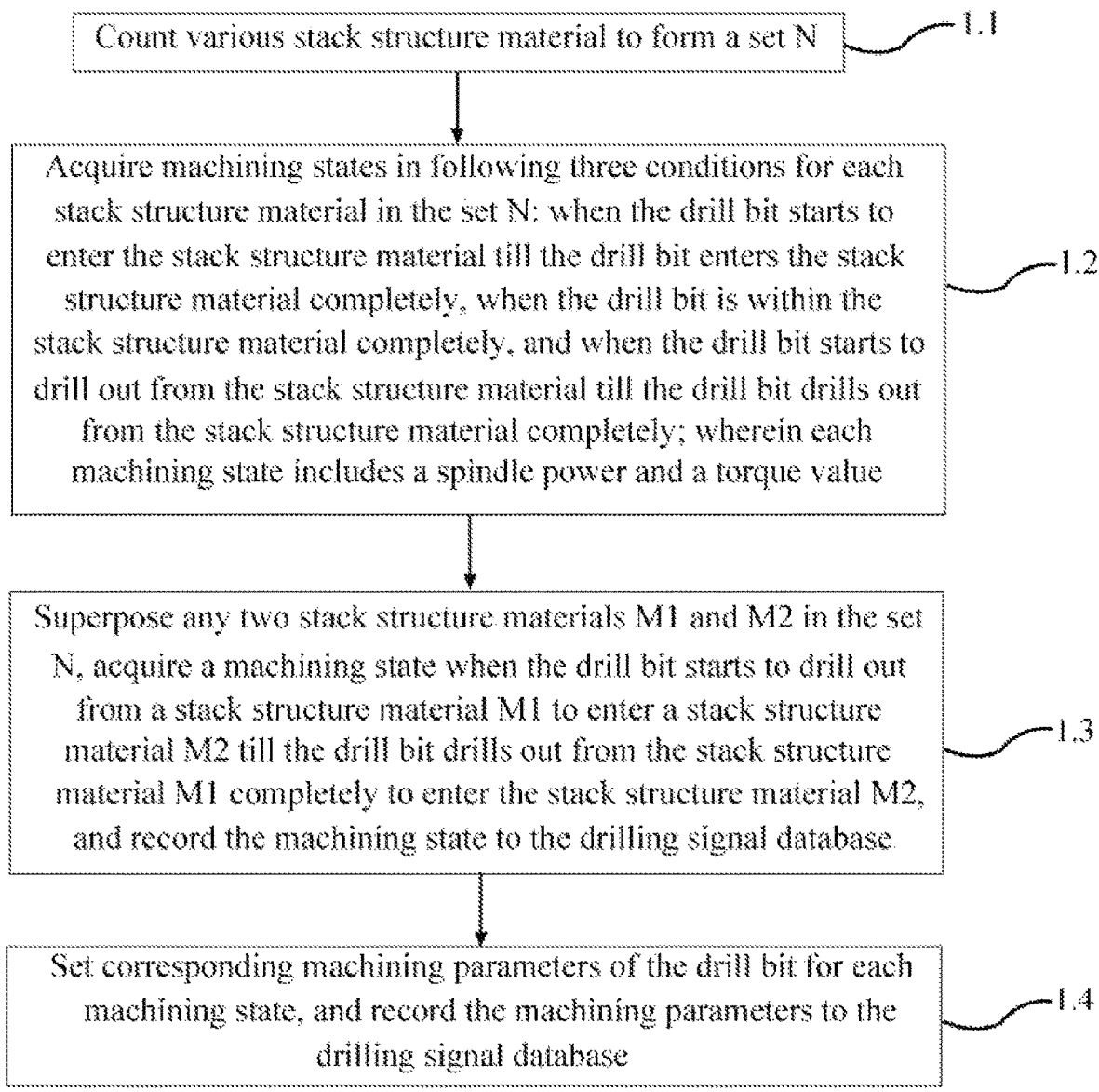
FIG. 4 is a flow chart of step 1) in the monitoring method according to the embodiment of the present disclosure.
Figure 5:
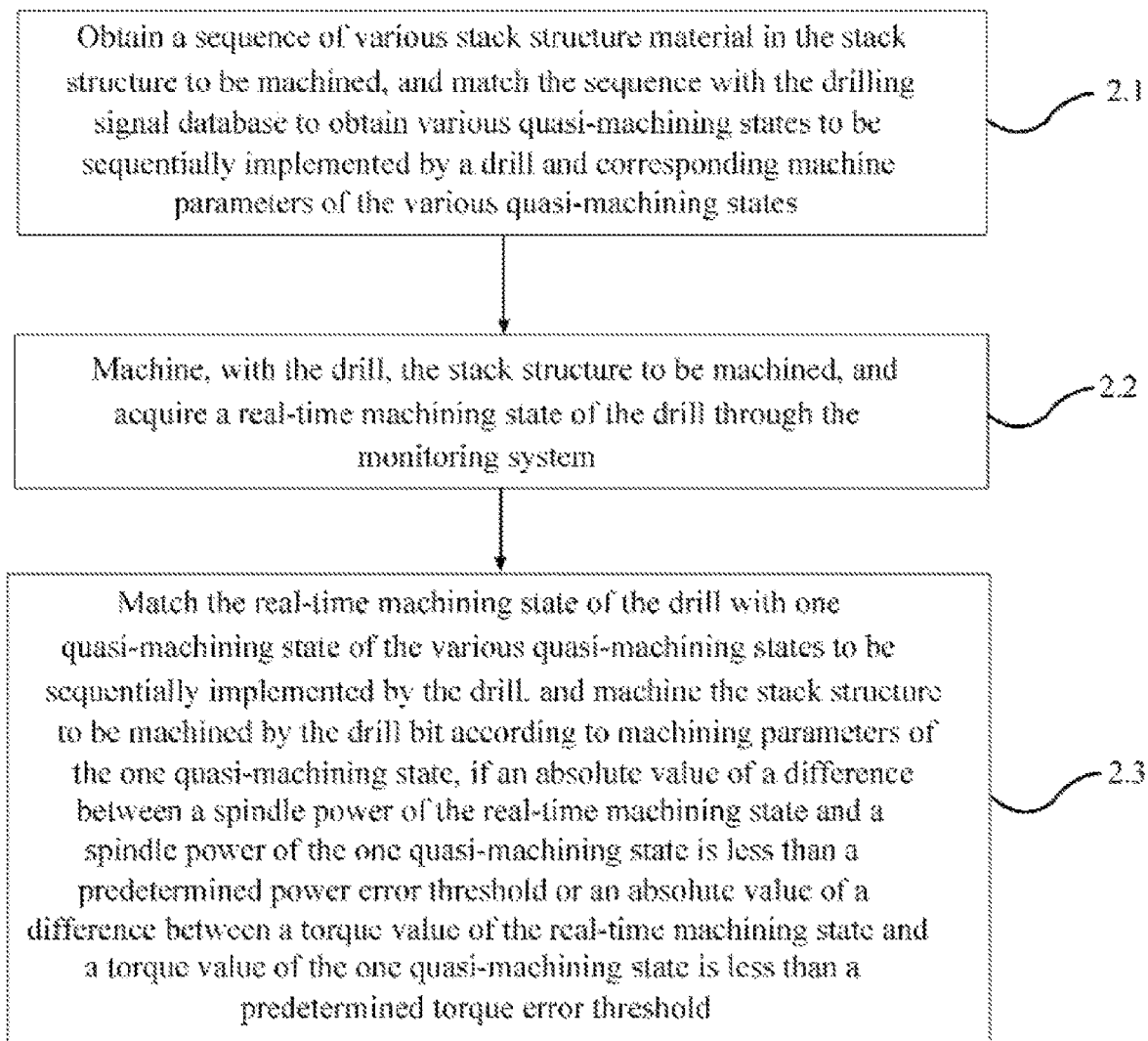
FIG. 5 is a flow chart of step 2) in the monitoring method according to the embodiment of the present disclosure.

As shown in FIG. 1, a monitoring method for vibration drilling state of a stack structure material is provided. As shown in FIGS. 3-5, where FIG. 3 is a flow chart of the monitoring method for vibration drilling state of a stack structure material according to the present disclosure, FIG. 4 is a flow chart of step 1) in the monitoring method according to the present disclosure, and FIG. 5 is a flow chart of step 2) in the monitoring method according to the present disclosure, the monitoring method specifically includes the following steps.

In step 1.0), the drilling signal database is established.

Specifically, in step 1.1), various stack structure material is counted to form a set N.

In step 1.2), for each material in the set N, machining states in following three conditions (i.e., real-time machining states) is acquired: 1) when the drill bit 1 starts to enter the stack structure material till the drill bit 1 enters the stack structure material completely; 2) when the drill bit 1 is within the stack structure material completely; and 3) when the drill bit 1 starts to drill out from the stack structure material till the drill bit 1 drills out from the stack structure material completely. The machining state includes a spindle power and a torque value. The drill bit 1 is any conventional drill bit. The position where the drill bit 1 starts to enter the stack structure material is shown by reference numeral 5. The position where the drill bit 1 is within the stack structure material completely is shown by reference numeral 6. The position where the drill bit 1 starts to drill out from the stack structure material is shown by reference numeral 7.

Figure 2:
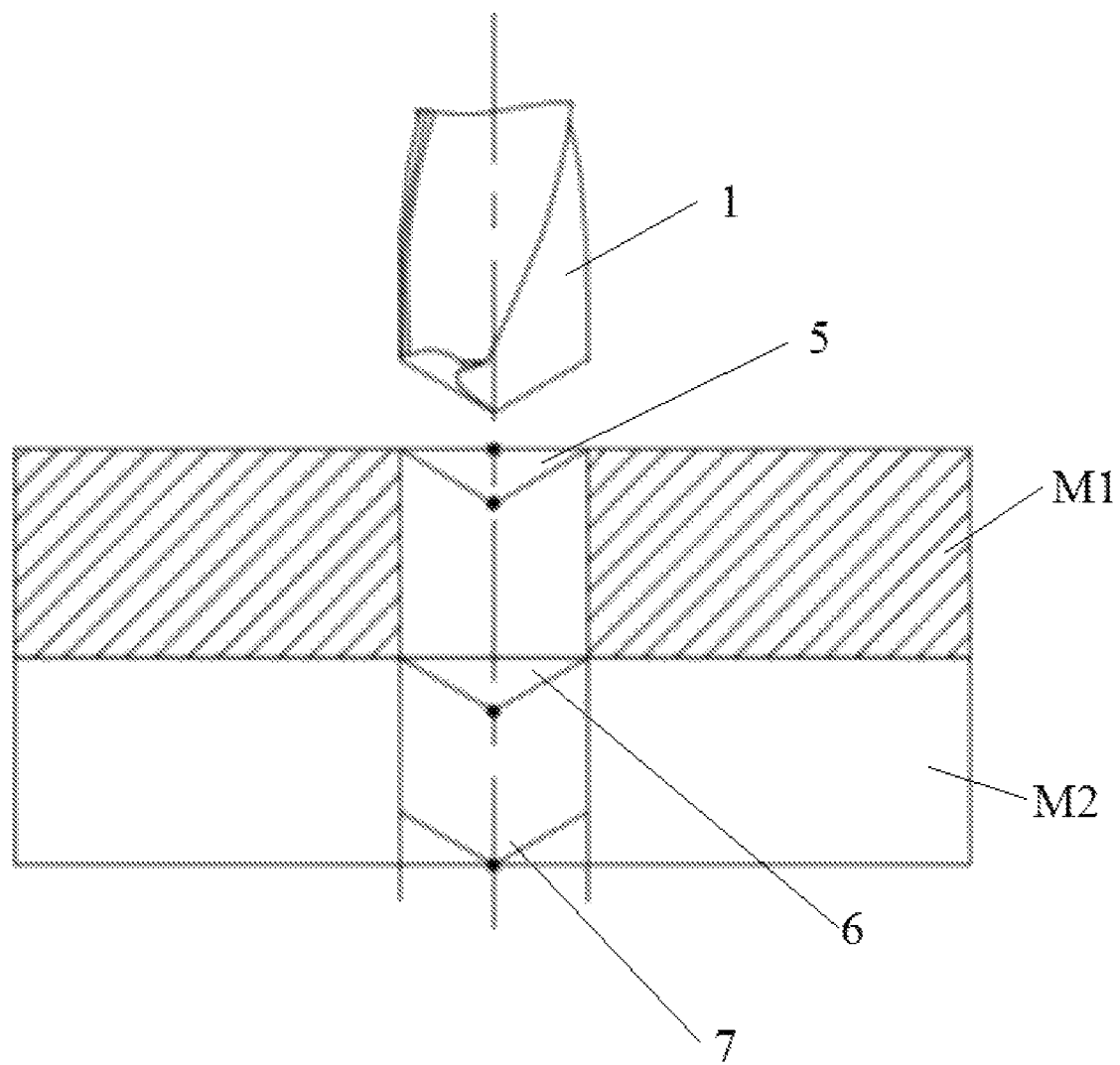
FIG. 2 is a schematic diagram showing different drilling positions of a drill in a process of drilling two stack structure materials according to the present disclosure.

In step 1.3), any two stack structure materials M1 and M2 in the set N are superposed, a machining state is acquired when the drill bit 1 starts to drill out from a stack structure material M1 to enter a stack structure material M2 till the drill bit 1 drills out from the stack structure material M1 completely to enter the stack structure material M2, including the drill bit 1 drill out from material 2 to enter material 3 and the drill bit 1 drill out from material 3 to enter material 4, and the machining state is recorded to the drilling signal database, as shown in FIGS. 1-2. Where FIG. 2 is a schematic diagram showing different drilling positions of a drill in a process of drilling two stack structure materials according to the present disclosure. The materials 2, 3 and 4 are different materials.

In step 1.4), for each machining state, corresponding machining parameters of the drill bit 1 are set, and recorded (i.e., constructed) to the drilling signal database.

In step 2.0), for a stack structure to be machined, following steps are performed.

Specifically, in step 2.1), a sequence of various stack structure material in the stack structure to be machined is obtained, and the sequence is matched with the drilling signal database to obtain various quasi-machining states (i.e., states to be machined) to be sequentially implemented by a drill (that is, the machining state of the drill bit in the database for drilling each layer of the stack material in sequence) and corresponding machining parameters thereof, and a predetermined threshold is recorded in the numerical control system.

In step 2.2), the stack structure to be machined is machined with the drill bit 1, and the real-time machining state (that is, the spindle power value during real-time machining) of the drill is acquired through the monitoring system.

In step 2.3), the real-time machining state of the drill are matched with each quasi-machining state to be sequentially implemented by the drill, and if an absolute value of a difference between a spindle power of the real-time machining state and a spindle power of the quasi-machining state is less than a predetermined power error threshold or an absolute value of a difference between a torque value of the real-time machining state and a torque value of the quasi-machining state is less than a predetermined torque error threshold, the stack structure to be machined is machined by the drill bit 1 according to machining parameters of the quasi-machining state.

As shown in FIG. 1, a monitoring device is also provided, which includes a test database, an execution system, a monitoring system, and the numerical control system. The test database is configured to record the machining state of the drill when drilling different materials. The test database is communicatively connected with numerical control system (SIEMENS 840D), and is configured to include: following three conditions for each stack structure material in the set N of stack structure material: when the drill bit starts to enter the stack structure material till the drill bit enters the stack structure material completely, when the drill bit is within the stack structure material completely, and when the drill bit starts to drill out from the stack structure material till the drill bit drills out from the stack structure material completely; where each machining state includes a spindle power and a torque value; following conditions for any two stack structure materials M1 and M2 in the set N of the stack structure material: when the drill bit starts to drill out from a stack structure material M1 to enter a stack structure material M2 till the drill bit drills out from the stack structure material M1 completely to enter the stack structure material M2, and recording the machining state to the drilling signal database; and machining parameters of the drill bit for each of the conditions. The execution system is the actual machining spindle and tool in the machining, and is communicatively connected with the numerical control system. The monitoring system is communicatively connected with the numerical control system and the execution system. The monitoring system is any conventional device for monitoring. The numerical control system is configured for: obtaining a sequence of various stack structure material in the stack structure to be machined, and searching test database to obtain various quasi-machining states to be sequentially implemented by a drill and corresponding machining parameters of a drill bit for the various quasi-machining states;

controlling the drill bit to machine the stack structure to be machined, and receiving a real-time machining state of the drill through the monitoring system; and comparing the real-time machining state of the drill with one quasi-machining state of the various quasi-machining states to be sequentially implemented by the drill, and controlling the stack structure to be machined by the drill bit to be machined according to machining parameters of the one quasi-machining state, if an absolute value of a difference between a spindle power of the real-time machining state and a spindle power of the one quasi-machining state is less than a predetermined power error threshold or an absolute value of a difference between a torque value of the real-time machining state and a torque value of the one quasi-machining state is less than a predetermined torque error threshold.

Those skilled in the art can understand that, unless otherwise defined, all terms (including technical terms and scientific terms) used herein have the same meanings as those commonly understood by those of ordinary skill in the art to which the present disclosure belongs. It should also be understood that terms such as those defined in general dictionaries should be understood as having meanings consistent with the meanings in the context of the prior art, and unless otherwise defined herein, these terms will not be explained in ideal or overly-formal meanings.

The objectives, technical solutions, and beneficial effects of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A monitoring method for vibration drilling state of a stack structure material, comprising:

obtaining a sequence of various stack structure material in the stack structure to be machined, and searching test database to obtain various quasi-machining states to be sequentially implemented by a drill and corresponding machining parameters of a drill bit for the various quasi-machining states;

controlling the drill bit to machine the stack structure to be machined, and receiving a real-time machining state of the drill through the monitoring system; and comparing the real-time machining state of the drill with each of the various quasi-machining states to be sequentially implemented by the drill, and controlling the stack structure to be machined by the drill bit to be machined according to machining parameters of one of the quasi-machining states, if an absolute value of a difference between a spindle power of the real-time machining state and a spindle power of the one of the quasi-machining states is less than a predetermined power error threshold or an absolute value of a difference between a torque value of the real-time machining state and a torque value of the one of the quasi-machining states is less than a predetermined torque error threshold, wherein each of the quasi-machining states indicates a state to be machined;

wherein the test database comprises:

following three conditions for each stack structure material in a set N of the stack structure material: when the drill bit starts to enter the stack structure material till the drill bit enters the stack structure material completely, when the drill bit is within the stack structure material completely, and when the drill bit starts to drill out from the stack structure material till the drill bit drills out from the stack structure material completely;

wherein each of the quasi-machining states comprises a spindle power and a torque value;

following conditions for any two stack structure materials M1 and M2 in the set N of the stack structure material: when the drill bit starts to drill out from a stack structure material M1 to enter a stack structure material M2 till the drill bit drills out from the stack structure material M1 completely to enter the stack structure material M2, wherein the quasi-machining states of the conditions are recorded to the test database; and the machining parameters of the drill bit for each of the conditions.

2. A monitoring device, comprising:

a test database, which is communicatively connected with a numerical control system, and is configured to comprise:

following three conditions for each stack structure material in a set N of the stack structure material: when the drill bit starts to enter the stack structure material till the drill bit enters the stack structure material completely, when the drill bit is within the stack structure material completely, and when the drill bit starts to drill out from the stack structure material till the drill bit drills out from the stack structure material completely; wherein each of a plurality of quasi-machining states comprises a spindle power and a torque value, and each of the quasi-machining states indicates a state to be machined;

following conditions for any two stack structure materials M1 and M2 in the set N of the stack structure material: when the drill bit starts to drill out from a stack structure material M1 to enter a stack structure material M2 till the drill bit drills out from the stack structure material M1 completely to enter the stack structure material M2, wherein the quasi-machining states of the conditions are recorded to the test database; and machining parameters of the drill bit for each of the conditions;

an execution system, which is communicatively connected with the numerical control system;

a monitoring system, which is communicatively connected with the numerical control system and the execution system; and the numerical control system, which is configured for:

obtaining a sequence of various stack structure material in the stack structure to be machined, and searching the test database to obtain various quasi-machining states to be sequentially implemented by a drill and corresponding machining parameters of a drill bit for the various quasi-machining states;

controlling the drill bit to machine the stack structure to be machined, and receiving a real-time machining state of the drill through the monitoring system; and comparing the real-time machining state of the drill with each of the various quasi-machining states to be sequentially implemented by the drill, and controlling the stack structure to be machined by the drill bit to be machined according to machining parameters of one of the quasi-machining states, if an absolute value of a difference between a spindle power of the real-time machining state and a spindle power of the one of the quasi-machining states is less than a predetermined power error threshold or an absolute value of a difference between a torque value of the real-time machining state and a torque value of the one of the quasi-machining states is less than a predetermined torque error threshold.

* * * * *